UNITED STATES PATENT OFFICE.

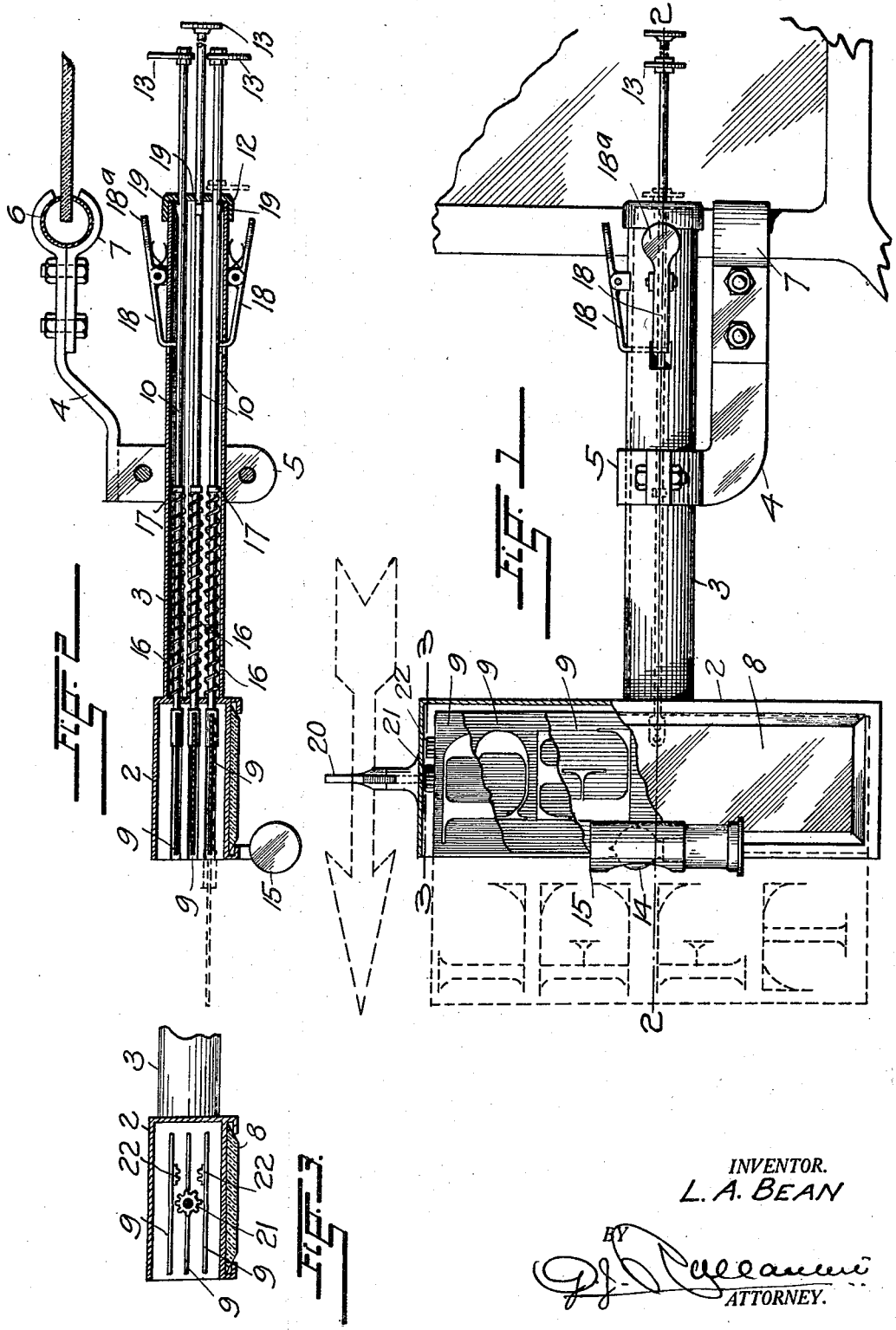

LOUIS A. BEAN, OF DENVER, COLORADO.

DIRECTION INDICATOR FOR AUTOMOBILES.

1,413,823. Specification of Letters Patent. Patented Apr. 25, 1922.

Application filed June 9, 1920. Serial No. 387,639.

*To all whom it may concern:*

Be it known that I, LOUIS A. BEAN, a citizen of the United States, residing at Denver, in the county of Denver and State of Colorado, have invented certain new and useful Improvements in Direction Indicators for Automobiles, of which the following is a specification.

This invention relates to direction indicators for motor vehicles and its primary object resides in the provision of a simple, practical and highly efficient mechanism for projecting a signal from a side of a vehicle to indicate to pedestrians or drivers of approaching or following cars, a contemplated change in the direction or the speed of the vehicle.

The above and other objects of my invention all of which will be fully disclosed in the source of the following description, I attain by the construction and arrangements of part shown in the accompanying drawings wherein like characters of reference denote corresponding parts throughout the several views and in which—

Figure 1 represents a partially sectional side elevation of my improved direction indicator;

Figure 2, a section taken on the line 2—2, Figure 1; and

Figure 3, a fragmentary section on the line 3—3, of Figure 1.

Referring first to Figures 1 to 3 of the drawings, my improved direction indicator comprises a casing 2 mounted transversely at an end of a tubular arm which by means of a convenient clamping device is in practise secured at the side of a windshield of a motor vehicle in a horizontally projecting position.

The clamping device consists in its preferred form of a strap 4 having at one end of its ends a box adapted to receive the tubular arm and to adjustably secure it in its projecting position, and provided at its other end with integral and relatively movable jaws 6 and 7 which cooperate to fasten the strap to one of the usually tubular sideposts of the windshield.

The casing which extends transverse so vertically at the end of the arm has at its rearward side a mirror 8 which enables the driver of the automobile to observe the movements if vehicles at the rear thereof.

The casing which is open at its outer edge, houses three signal blades 9 separately mounted at the ends of rods 10 which extend slidingly through openings in the wall of the housing at which it adjoins the outer end of the tubular arm, and through therewith alined openings in a cap 12 which closes the opposite end of the same. Knobs 13 at the free ends of the rods permit of their ready manipulation by the driver of the vehicle.

Each blade carries at one or both sides an appropriate signal, such as one of the words—"Right", "Left" or "Stop", so that by projecting one or another of the blades outside the casing in which they are normally concealed, pedestrians or drivers of approaching and following vehicles may be warned of contemplated changes in the direction or the speed of the car to which the indicator is applied.

An incandescent lamp 14 in a suitable holder 15 is positioned at a side of the casing to illuminate the signal-bearing sides of the projected blades at night.

Springs 16 coiled around the rods inside the tubular arm between the rear wall of the casing and collars 17 on the rods, normally hold the blades in their retracted position and automatically return the projected blades to their normal position, when their respective rods are released.

Spring-pressed catches 18 pivotally mounted on the tubular arm, project through openings thereof for cooperation with beveled shoulders 19 on the rods to lock the respective signal blades in their exposed positions.

As an auxiliary means for indicating the contemplated course of travel of the vehicle, the casing carries at its top a preferably arrow-shaped semaphore arm 20 which is mounted for rotation by a vertical pivot pin projecting through an opening in the casing. The arrow which normally extends in a position parallel with the side of the vehicle, has at the end of its pivot pin within the casing, a pinion 21 adapted to be operatively engaged by short racks 22 at the upper ends of the blades which carry the signals "Right" and "Left."

The blades in their retracted position extend at opposite sides of the axis of rotation of the semaphore arm and the racks are placed to one side thereof so that when the blade bearing the word "Left" is projected, the arrow will turn through an angle of 90° to a position in which it points to the left as shown in Figure 1 in broken lines, while when the other blade is projected, the arrow is turned through a similar arc to point to the right.

It will thus be seen that my improved indicator includes two distinct and separate signaling elements which operate conjointly to unmistakably denote the intended change in the direction or the speed of the vehicle.

In the operation of the indicator the driver of the vehicle manually projects the appropriate signal blade by pressure on the knob of its rod until the inner end of the respective catch has passed the beveled face of the shoulder of the rod and thereby automatically locks the blade in its exposed position.

When it is found desirable to return the blade to its original position, the operator presses upon a thumb-piece 18ª at the outer end of the respective catch, thereby releasing the rod to which the blade is fastened and allowing the spring to automatically retract the same.

Having thus described my improved direction indicator in the most practical form at present known to me, I desire it understood that I do not wish to be limited to details of construction and that modifications other than those shown and described may be resorted to within the principle of my invention as defined in the following claims.

What I claim and desire to secure by Letters-Patent is:

1. A direction indicator for automobiles comprising a casing, a single blade bearing a designating legend, normally disposed therein and slidable to a position in which its legend is exposed, a pivoted semaphore arm exteriorly of the casing, a pinion connected with said arm and a rack on the blade cooperating with the pinion.

2. A direction indicator for automobiles comprising a hollow arm, a casing at an end thereof, means to support the arm in a projecting position on an automobile, a signal blade normally disposed in the casing and movable to an exposed position, a non-rotary push rod supported in the arm in fixed connection with the blade, a catch passing through an opening in the arm and acting upon the rod to lock the blade in its projecting position, and a spring adapted to automatically return the blade to its normal position when released.

3. A direction indicator for automobiles comprising a hollow arm, a casing at an end thereof, means to support the arm in a projecting position on an automobile, a signal blade normally disposed in the casing and movable to an exposed position, a non-rotary push rod passing through an end of the casing and supported in the arm in fixed connection with the blade, a catch passing through an opening in the arm and acting upon the rod to lock the blade in its projecting position, and a spring adapted to automatically return the blade to its normal position when released.

4. A direction indicator for automobiles comprising a hollow arm, a casing at an end thereof, a plurality of separately movable sliding signal members normally disposed in the casing, and each consisting of a rod extending through the arm and a blade rigidly attached at an end thereof, and means to separately lock the members in an adjusted position.

5. A direction indicator for automobiles comprising a hollow arm, a casing at an end thereof, a plurality of separately movable sliding signal members normally disposed in the casing, and each consisting of a rod extending through the arm and a blade rigidly attached at an end thereof, means to separately lock the members in an adjusted position, and springs to automatically return the members to their normal position, when released.

6. A direction indicator for automobiles comprising a hollow arm, a casing at an end thereof, means to support the arm in a projecting position on an automobile, a signal blade normally disposed in the casing and movable to an exposed position, a non-rotary push rod passing through both ends of the arm and slidably supported in fixed connection with the blade, a catch passing through an opening in the arm and acting upon the rod to lock the blade in its projecting position, and a spring adapted to automatically return the blade to its normal position when released.

7. A direction indicator for automobiles comprising a stationary support, a signal blade having a sliding movement with relation thereto, a rotary semaphore arm on the support, and means to convert the sliding movement of the signal blade into a rotary movement of the semaphore arm.

In testimony whereof I have affixed my signature.

LOUIS A. BEAN.